(12) United States Patent
Andoni (10) Patent No.: US 9,544,135 B2
(45) Date of Patent: Jan. 10, 2017

(54) METHODS OF AND SYSTEMS FOR FACILITATING DECRYPTION OF ENCRYPTED ELECTRONIC INFORMATION

(71) Applicant: Issam Andoni, Chantilly, VA (US)

(72) Inventor: Issam Andoni, Chantilly, VA (US)

(*) Notice: Subject to any disclaimer, the term of this patent is extended or adjusted under 35 U.S.C. 154(b) by 0 days.

(21) Appl. No.: 14/738,204

(22) Filed: Jun. 12, 2015

(65) Prior Publication Data

US 2015/0280911 A1     Oct. 1, 2015

Related U.S. Application Data (63) Continuation-in-part of application No. 14/066,131, filed on Oct. 29, 2013, and a continuation-in-part of application No. PCT/US2014/038313, filed on May 16, 2014, which is a continuation-in-part of application No. 14/066,131, filed on Oct. 29, 2013.

(Continued)

(51) Int. Cl.
| | | |
|---|---|---|
| *H04L 29/06* | (2006.01) | |
| *H04L 9/08* | (2006.01) | |
| *H04L 9/32* | (2006.01) | |
| *H04W 12/04* | (2009.01) | |
| *H04W 12/06* | (2009.01) | |

(52) U.S. Cl.
CPC .......... *H04L 9/0825* (2013.01); *H04L 9/0877* (2013.01); *H04L 9/3234* (2013.01); *H04L 63/0428* (2013.01); *H04L 63/062* (2013.01); *H04W 12/04* (2013.01); *H04W 12/06* (2013.01)

(58) Field of Classification Search
CPC ..... H04L 9/0825; H04L 9/3263; H04L 9/3234
USPC .......................................................... 713/170
See application file for complete search history.

(56) References Cited

U.S. PATENT DOCUMENTS

| | | | | |
|---|---|---|---|---|
| 6,775,382 B1* | 8/2004 | Al-Salqan | ............. | H04L 9/0894 380/280 |
| 7,921,292 B1* | 4/2011 | Pauker | .................... | H04L 9/083 713/171 |

(Continued)

OTHER PUBLICATIONS

Frosch, "How Secure is TextSecure?", 2016, IEEE, p. 457-472.*

*Primary Examiner* — Morshed Mehedi
*Assistant Examiner* — Gregory Lane (57) ABSTRACT

Disclosed herein are methods of and systems for facilitating decryption of encrypted electronic information to obtain unencrypted electronic information for consumption by an authorized recipient. A decryption server receives a request for decryption sent by a requesting entity. Subsequently, prior to fulfilling the request for decryption, authentication of the requesting entity may be performed based on a secondary credential. The secondary credential may be issued based on the primary credential. Thereafter, the decryption server retrieves the decryption key by communicating with a source entity, such as a certificate authority, that issued the decryption key. Subsequently, the decryption server decrypts the encrypted electronic information utilizing the decryption key. Thereafter, in an embodiment, the decryption server may transmit the unencrypted electronic information to the requesting entity. In another embodiment, the decryption server may re-encrypt the unencrypted electronic information based on the secondary credential, in order to obtain a secondary encrypted electronic information.

32 Claims, 4 Drawing Sheets

Related U.S. Application Data

(60) Provisional application No. 61/861,869, filed on Aug. 2, 2013.

(56) References Cited

U.S. PATENT DOCUMENTS

| | | | |
|---|---|---|---|
| 2002/0004902 A1* | 1/2002 | Toh | H04L 63/0442 713/170 |
| 2006/0230446 A1* | 10/2006 | Vu | H04L 63/166 726/15 |
| 2008/0216147 A1* | 9/2008 | Duffy | G06Q 10/10 726/1 |
| 2010/0031029 A1* | 2/2010 | Ilyadis | H04L 9/3271 713/156 |
| 2010/0268936 A1* | 10/2010 | Matsushima | G06F 21/62 713/153 |
| 2014/0215586 A1* | 7/2014 | Tilton | G06F 21/34 726/6 |
| 2015/0332029 A1* | 11/2015 | Coxe | H04L 63/0815 726/9 |

* cited by examiner

METHODS OF AND SYSTEMS FOR FACILITATING DECRYPTION OF ENCRYPTED ELECTRONIC INFORMATION

CROSS-REFERENCE TO RELATED APPLICATIONS

This application is a continuation-in-part application of a co-pending U.S. patent application Ser. No. 14/066,131, filed on Oct. 29, 2013 which claims benefit of provisional patent application No. 61/861,869, filed on Aug. 2, 2013 which is incorporated herein by reference in its entirety. This application is furthermore a continuation-in-part application of a PCT patent application number PCT/US14/38313, filed on May 16, 2014 which is a continuation-in-part application of co-pending U.S. patent application Ser. No. 14/066,131, filed on Oct. 29, 2013 and claims benefit of provisional patent application No. 61/861,869, filed on Aug. 2, 2013.

FIELD OF THE INVENTION

Generally, the disclosure relates to the field of cryptography. More specifically, the disclosure relates to methods of and systems for facilitating decryption of encrypted electronic information.

BACKGROUND

It is often required to limit availability of confidential electronic information only to authorized individuals. Several techniques exist for ensuring that only intended recipients are able to access confidential information. These techniques vary in their complexity and degree of security provided. Encryption is one such technique which is commonly used where a high degree of security is required.

Encryption may be of two types, namely, symmetric encryption and asymmetric encryption. In symmetric encryption, a secret key which is used to encrypt electronic information is shared between a sender and a recipient of the electronic information. The secret key is used for both encryption and decryption of the electronic information. In comparison, asymmetric encryption uses a public key corresponding to a recipient to encrypt electronic information. However, in order to decrypt the encrypted electronic information, a decryption key, called a private key, is required. Further, the private key is meant to be accessible only by the recipient. Asymmetric encryption has been found to provide robust protection of electronic information and ease of use where a single recipient receives confidential information from multiple senders.

Generally, it may be assumed that an authorized recipient has access to a decryption key and may thus decrypt an encrypted electronic information. However, situations may arise where the decryption key is not available to use. Nonetheless, the authorized recipient may need to access the electronic information, without of course compromising confidentiality. One such situation is where the decryption key is contained in a smart-card and an electronic device used by the recipient to access the electronic information does not include a smart-card reader. Moreover, there may be situations where even when the decryption key is available, it may not be preferable to use on an electronic device. For example, the electronic device may not be capable of performing the decryption within an acceptable time-frame due to constraints on available computing resources.

In all such cases where the decryption key is not available or not preferable to use due to any reason, an authorized recipient is unable to access the electronic information. Therefore, there is a need for methods and systems for allowing an authorized recipient to decrypt encrypted electronic information in such cases without compromising protection of the electronic information from unauthorized individuals.

SUMMARY

Disclosed herein are methods of and systems for facilitating decryption of encrypted electronic information to obtain unencrypted electronic information for consumption by an authorized recipient. The methods and systems disclosed are useful in, but are not limited to, situations where a primary credential, such as a decryption key, required to decrypt the encrypted electronic information is not available to the authorized recipient or is not preferable to use by the authorized recipient due to any reason.

According to methods and systems disclosed herein, a decryption server receives a request for facilitating decryption sent by a requesting entity. Further, the request may include the encrypted electronic information. In an embodiment, the encrypted electronic information may be an encrypted session key corresponding to an encrypted electronic message. In an embodiment, prior to fulfilling the request for decryption, authentication of the requesting entity may be performed. In order to perform authentication of the requesting entity, a secondary credential may be used. In an embodiment, the secondary credential may be issued based on the primary credential. For example, the secondary credential may be a derived credential issued based on validation of the primary credential. Subsequent to providing authentication based on the secondary credential, the decryption server retrieves the decryption key. The decryption server may retrieve the decryption key by communicating with a source entity, such as a certificate authority, that issued the decryption key. Thereafter, the decryption server decrypts the encrypted electronic information utilizing the decryption key. Subsequently, in an embodiment, the decryption server may transmit the unencrypted electronic information to the requesting entity over a secure communication channel such as a TLS channel. In another embodiment, the decryption server may re-encrypt the unencrypted electronic information based on the secondary credential, in order to obtain a secondary encrypted electronic information. Thereafter, the decryption server may transmit the secondary encrypted electronic information to the requesting entity. Following this, the requesting entity may utilize the secondary credential to decrypt the secondary encrypted electronic information to obtain the unencrypted electronic information.

Further, a method of facilitating decryption of an encrypted electronic message is disclosed. According to the method, a primary encrypted session key is received. The primary encrypted session key is generated based on a primary credential corresponding to an authorized recipient of the encrypted electronic message. Additionally, the primary credential corresponds to a primary public key. Subsequently, a primary private key corresponding to the primary credential is retrieved. Thereafter, the primary encrypted session key is decrypted based on the primary private key to obtain an unencrypted session key. Subsequently, provision of a decrypted electronic message at an electronic device corresponding to the authorized recipient is facilitated based on each of the unencrypted session key and a secondary credential corresponding to the authorized recipient. The secondary credential may be issued based on the primary credential. Moreover, in an embodiment, the secondary credential may be used for authenticating the requesting entity. In an embodiment, provision of the decrypted electronic message is facilitated by providing the unencrypted session key to the electronic device. In another embodiment, provision of the decrypted electronic message is facilitated by providing a secondary encrypted session key. The secondary encrypted session key is obtained by re-encrypting the unencrypted session key based on the secondary credential.

Furthermore, a system for facilitating decryption of an encrypted electronic message is disclosed. The system is configured to receive a primary encrypted session key. The primary encrypted session key is generated based on a primary credential corresponding to an authorized recipient of the encrypted electronic message. Further, the primary credential corresponds to a primary public key. Additionally, the system is configured to retrieve a primary private key corresponding to the primary credential. Further, the system is also configured to decrypt the primary encrypted session key based on the primary private key to obtain an unencrypted session key. Further yet, the system is configured to facilitate provision of a decrypted electronic message at an electronic device corresponding to the authorized recipient based on each of the unencrypted session key and a secondary credential corresponding to the authorized recipient. The secondary credential may be issued based on the primary credential. Moreover, in an embodiment, the secondary credential may be used for authenticating the requesting entity. In an embodiment, the system is configured to facilitate provision of the decrypted electronic message by providing the unencrypted session key to the electronic device. In another embodiment, the system is configured to facilitate provision of the decrypted electronic message by providing a secondary encrypted session key to the electronic device. The secondary encrypted session key is obtained by re-encrypting the unencrypted session key based on the secondary credential.

Also disclosed is a non-transitory computer readable medium for executing a method for facilitating decryption of an encrypted electronic message at an electronic device. The electronic device may correspond to an authorized recipient of the encrypted electronic message. Further the non-transitory computer readable medium may comprise program code recorded thereon such that when placed in communicable contact with a processor comprised in the electronic device, the processor extracts a primary encrypted session key from the encrypted electronic message. The primary encrypted session key may be generated based on a primary credential corresponding to the authorized recipient. Further, the primary credential corresponds to a primary public key. Subsequently, the processor transmits each of the primary encrypted session key and at least a part of a secondary credential to an external server. The external server may be a decryption server. Additionally, the secondary credential may provide authentication of the electronic device with a Level of Assurance (LOA) of high value. Thereafter, the processor receives an unencrypted session key from the external server. Following this, the processor facilitates decryption of the encrypted electronic message based on the unencrypted session key. In another embodiment, the processor may receive a secondary encrypted session key from the external server. The secondary encrypted session key may be generated by the external server by encrypting the unencrypted session key using the secondary credential. Accordingly, the processor may decrypt the secondary encrypted session key using the secondary credential.

DETAILED DESCRIPTION

Disclosed herein are methods and systems for facilitating decryption of encrypted electronic information to obtain unencrypted electronic information for consumption by an authorized recipient. The unencrypted electronic information may be, but is not limited to, electronic communication such as e-mail. Other examples of the unencrypted information include text documents, media files, source code files, configuration files, binary files, cryptographic keys, databases and application specific files. In a particular embodiment, the unencrypted electronic information may be a session key corresponding to an encrypted electronic message as explained in detail in conjunction with FIG. 3 later on. Further, the unencrypted information may be subjected to one or more of symmetric encryption and asymmetric encryption in order to yield the encrypted electronic information.

The authorized recipient is one who is legitimately entitled to consume the unencrypted electronic information. The authorized recipient may be one or more of a human user, a software entity and a hardware entity. For example, the authorized recipient may be an application program executable on an electronic device. In an embodiment, the authorized recipient may be directly addressed as a recipient of the encrypted electronic information. In another embodiment, the authorized recipient may not be addressed as a recipient of the encrypted electronic information. However, the authorized recipient may still be entitled to consume the unencrypted electronic information based on a privilege level associated with the authorized recipient.

The methods and systems disclosed are useful in, but are not limited to, situations where a primary credential, such as a decryption key, required to decrypt the encrypted electronic information is not available to the authorized recipient or is not preferable to use by the authorized recipient due to any reason. For example, the decryption key may be contained on a media, such as a smart-card, which is not readable by an electronic device, such as a smart-phone, which is used by the authorized recipient to decrypt the encrypted electronic information. Similarly, there may be a case of a damaged smart-card, a malfunctioning smart-card reader, a lost or misplaced smart-card or inconvenience in using the smart-card. Further, in such cases, a security policy corresponding to the decryption key may forbid exporting of the decryption key onto the electronic device. As another example, the authorized recipient may temporarily not be in possession of a media containing the decryption key. In yet another example, the authorized recipient may receive the encrypted electronic information from a trustee. For example, the trustee may be a colleague of the authorized recipient. The encrypted electronic information may be addressed to the trustee. Further, the trustee may have intentionally forwarded the encrypted electronic information based on a privilege level of the authorized recipient being same as that of the trustee. However, the forwarded message may not contain the decryption key. As another example, the authorized recipient may be an official of a regulatory agency. Further, the unencrypted electronic information belonging to an organization may be required to undergo inspection by the official on an electronic device belonging to the regulatory agency. Moreover, there may be situations in which an electronic device, where the unencrypted electronic information is required, may not have sufficient computational resources in order to perform the decryption within an acceptable time-frame.

Figure 1:
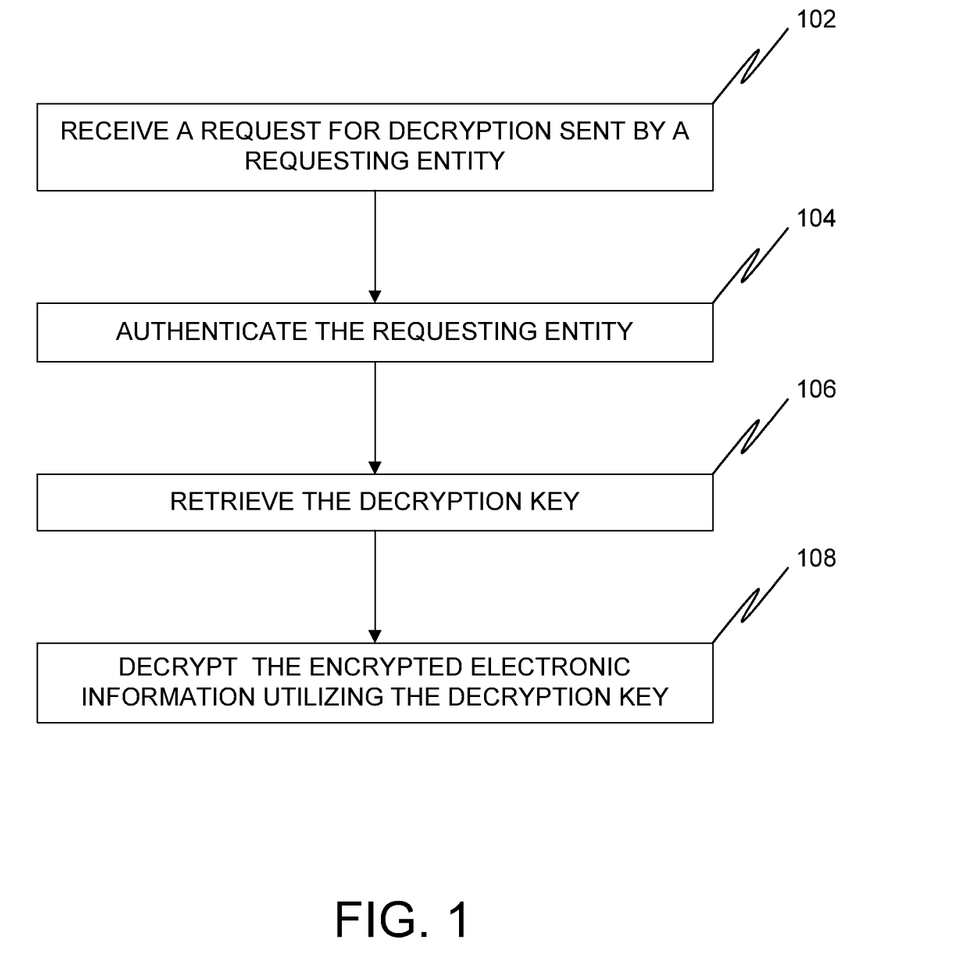
FIG. 1 illustrates a method of facilitating decryption of encrypted electronic information according to one set of embodiments.

FIG. 1 illustrates a method of facilitating decryption of encrypted electronic information in cases where the primary credential is unavailable or not preferable to use due to any reason, according to one set of embodiments. The primary credential may include one or more of, but is not limited to, an encryption key and a decryption key. Optionally, in some embodiments, the primary credential may additionally include one or more or an authentication key and a unique identifier. In an embodiment, the primary credential may be a smart-card credential.

At step 102, a decryption server receives a request for decryption sent by a requesting entity. In an instance, the requesting entity may be the electronic device being used by the authorized recipient. In another instance, the requesting entity may be an electronic device corresponding to a trustee who is entitled to grant permission to the authorized recipient for consumption of the unencrypted electronic information. In general, the requesting entity may be one or more of the authorized recipient, the trustee and a hardware or software entity providing a service to one or more of the authorized recipient and the trustee. Some examples of the requesting entity include, without limitation, an application executable on the electronic device corresponding to the authorized recipient, a Mobile Device Management (MDM) server, an application server, such as an email server, providing services to the authorized recipient and a proxy server mediating communication between the electronic device corresponding to the authorized recipient and the decryption server.

In an embodiment, the request for decryption may be initiated manually by one or more of the authorized recipient and the trustee. In another embodiment, the request for decryption may be automatically initiated based on pre-defined rules. For example, upon detection of an encrypted email addressed to the authorized recipient, an email server providing services to the authorized recipient may automatically initiate the request for decryption.

In an embodiment, the request for decryption may include the encrypted electronic information. In another embodiment, the request for decryption may not include the encrypted electronic information. In this case, the decryption server may already possess the encrypted electronic information. For example, in a case where the decryption server is implemented in the form of an email server, the encrypted electronic information may be present on the email server prior to receiving the request for decryption.

Additionally, in some embodiments, the request for decryption may include a unique identifier corresponding to one or more of the authorized recipient and the trustee. In another embodiment, the unique identifier may be separately sent to the decryption server. In an embodiment, the unique identifier is used by the decryption server for correctly identifying the decryption key required to decrypt the encrypted electronic information.

In an embodiment, each of the request for decryption and the encrypted electronic information may be sent on a common communication channel. In another embodiment, the request for decryption and the encrypted electronic information may be sent on disparate communication channels. Further, in an embodiment, one or more of the common communication channel and the disparate communication channels may be protected with a security protocol such as, but not limited to, Transport Layer Security (TLS). Examples of communication channel used in accordance with methods and systems disclosed herein include, but are not limited to, a Local Area Network (LAN), Wide Area Network (WAN), Virtual Private Network (VPN), telephone network, cellular network, Wimax, WiFi, Bluetooth, internal system bus of an electronic device and Inter-Process Communication (IPC) channel.

The decryption server is any hardware or software entity that is configured to access the decryption key corresponding to the encrypted electronic information. In an embodiment, the decryption server may be dedicated for providing a service of performing decryption on behalf of requesting clients. The requesting clients may be, but are not limited to, an electronic device used by an authorized recipient, an electronic device used by a trustee, an application executable on the electronic device corresponding to an authorized recipient, an application server, such as an email server, providing services to an authorized recipient and a proxy server mediating communication between the electronic device corresponding to an authorized recipient and the decryption server.

To ensure security, before fulfilling the request for decryption, authentication of the requesting entity is performed at step 104. In other words, the requesting entity is required to prove to the decryption server with a sufficient Level Of Assurance (LOA) that the requesting entity is authorized to perform one or more of issuance of the request for decryption and consumption of the unencrypted electronic information. The LOA corresponding to the authentication determines a degree of protection provided by the methods and systems disclosed herein. Generally, in embodiments where the decryption server is requested to provide unencrypted electronic information, a strong authentication of the requesting entity is required prior to fulfilling the request.

In order to perform authentication of the requesting entity, a secondary credential is used. The secondary credential may include one or more of, but is not limited to, an encryption key, a decryption key, an authentication key and a unique identifier. In an embodiment, the secondary credential may be distinct from the primary credential. In another embodiment, the secondary credential may be identical to the primary credential. In a further embodiment, the secondary credential may be a part of the primary credential. Moreover, in some embodiments, a media containing the secondary credential may be different from a media containing the primary credential. For example, the primary credential may be stored in an Integrated Circuit (IC) of a smart-card while the secondary credential may be stored as a software token inside a smart-phone. In another embodiment, the primary credential may be stored in the IC of the smart-phone while the secondary credential may be stored as a bar-code on the smart-card. As a result, in case the electronic device lacks a smart-card IC reader but includes an optical reader, the secondary credential may be retrieved and used instead of the primary credential to facilitate decryption of the encrypted electronic information.

In an embodiment, each of the primary credential and the secondary credential correspond to the authorized recipient. In another embodiment, the primary credential and the secondary credential may correspond to different authorized recipients. Moreover, one or more of the primary credential and the secondary credential may correspond to one or more of an individual and a group of individuals.

Further, in an embodiment, the secondary credential may be issued to the authorized recipient solely for purposes of authentication. In contrast, the primary credential may be issued to the authorized recipient for purposes of decryption. In other embodiments, each of the primary credential and the secondary credential may be issued for purposes of one or more of authentication, encryption and decryption.

Furthermore, in some embodiments, the secondary credential may be issued based on the primary credential. Particularly, the secondary credential may be issued to the authorized recipient based on a validation of the primary credential. Such a secondary credential is called a derived credential. The derived credential may include one or more of, but is not limited to, a derived encryption key, a derived decryption key and a derived authentication key. In an embodiment, the secondary credential may be issued in accordance with National Institute of Standards and Technology (NIST) Special Publication 800-157. As a result, the LOA corresponding to the secondary credential may be of high value. In an embodiment, the LOA corresponding to the secondary credential may be Level-3 or higher as defined in the document titled "E-Authentication Guidance for Federal Agencies" [Office of Management and Budget (OMB) 04-04]. Examples of the secondary credential include, but are not limited to, Universal Integrated Circuit Card (UICC) token, embedded hardware token, software token, Universal Serial Bus (USB) security token and MicroSD token.

The secondary credential may, in some embodiments, include the unique identifier used for correctly identifying the decryption key. For example, the secondary credential may include an e-mail identifier of the authorized recipient. In another example, the secondary credential may include an e-mail identifier of the trustee.

In some embodiments, an authentication proxy may be used in order to perform authentication of the requesting entity. In this case, the authentication proxy is in communication with each of the electronic device and the decryption server.

Subsequent to providing authentication based on the secondary credential, the decryption server retrieves the decryption key at step 106. The decryption key is retrieved based on the unique identifier provided to the decryption server. In order to perform the decryption, the decryption server may access the decryption key by communicating with a source entity, such as a certificate authority, that issued the decryption key. In another embodiment, the decryption server may be another electronic device corresponding to the authorized recipient such as an official workstation. As an example, a desktop computer of the authorized user may be provided access to a smart-card containing the decryption key and a mobile device of the authorized user may send the request for decryption to the desktop computer.

In an embodiment, the unique identifier may be received by the decryption server along with the request for decryption. In another embodiment, the decryption server may extract the unique identifier from the secondary credential provided to the decryption server during authentication. For example, if authentication of the request was performed based on a digital certificate, then one or more of the subject unique identifier and the public key value may be extracted from the digital certificate and used as the unique identifier.

In yet another embodiment, the unique identifier may be based on the primary credential. For example, the public key of the primary credential may be used as the unique identifier in order to determine the decryption key. Accordingly, in some embodiments, the public key may be transmitted to the decryption server along with the request for decryption.

Subsequently, based on the unique identifier, the decryption server may search a local cache to determine if the decryption key is located therein. In an embodiment, the decryption server may comprise a Hardware Security Module (HSM) in which the local cache is situated. In case the decryption key is not found in the local cache, the decryption server may communicate with a certificate authority that originally issued the decryption key. In some embodiments, the decryption server may authenticate itself to the certificate authority in order to retrieve the decryption key. For instance, the decryption server may provide a special credential issued to the decryption server by the certificate authority. In another instance, the decryption server may provide the secondary credential to the certificate authority to assure the certificate authority that its request for the decryption key is legitimate. Upon successful authentication of the decryption server, the certificate authority may send a copy of the decryption key to the decryption server over a secure communication channel. The communication between the decryption server and the certificate authority may be encrypted to ensure security of the decryption key. Subsequent to receiving the decryption key, the decryption server may store the decryption key in the local cache to aid faster retrieval when fulfilling subsequent requests for the decryption key.

Thereafter, at step 108, the decryption server decrypts the encrypted electronic information utilizing the decryption key. Subsequently, the decryption server may transmit the unencrypted electronic information to one or more of the requesting entity and the authorized recipient over a secure communication channel such as a TLS channel. As a result, one or more of the requesting entity and the authorized recipient are able to consume the unencrypted electronic information without providing the decryption key, while maintaining protection of the unencrypted electronic information from unauthorized individuals.

In some embodiments, subsequent to receiving the unencrypted electronic information, a re-encryption of the unencrypted electronic information may be performed. The re-encryption may be performed based on one or more of the secondary credential and an arbitrary credential. As an example, the arbitrary credential may be a randomly generated encryption key.

In an instance, the request for decryption may be sent by an email proxy application. In an embodiment, the email proxy application may be executable in the electronic device corresponding to the authorized recipient. In other embodiments, the email proxy application may be executable on any other device. The email proxy application may be configured to communicate with an email client application executable on the electronic device. Moreover, the email proxy application may mediate all communication between the email client application and an email server. Accordingly, the email client application may be configured to send requests to the email proxy. In an embodiment, a user of the electronic device may manually perform configuration of the email client application. For example, the user may modify a profile corresponding to the electronic device in order to direct requests from the email client application to the email proxy application. In another embodiment, configuration of the electronic device may be performed by a Mobile Device Management (MDM) server. The MDM server may automatically modify a profile of the electronic device in order to direct requests from the email client application to the email proxy application. In an instance, modifying the profile may be performed by sending a new profile to an MDM client application executable on the electronic device. Thereafter, the MDM client application may apply the new profile to the electronic device.

Subsequent to receiving the unencrypted electronic information, the email proxy application may re-encrypt the unencrypted electronic information based on one or more of the secondary credential and the arbitrary credential to yield a secondary encrypted electronic information. As a result, the email client application executable on the electronic device may be able to decrypt the secondary encrypted electronic information based on one or more of the secondary credential and the arbitrary credential. In this embodiment, one or more of the secondary credential and the arbitrary credential are accessible to each of the email proxy application and the email client application. An advantage of performing re-encryption is that the secondary electronic information continues to remain secured while also enabling a consuming application, such as the email client application, to access the unencrypted electronic information by utilizing one or more of the secondary credential and the arbitrary credential accessible to the consuming application.

In some embodiments, the unencrypted electronic information may be a session key corresponding to an encrypted electronic message that is to be consumed by the authorized recipient. Accordingly, subsequent to receiving the session key, the encrypted electronic message may be decrypted based on the session key. This is explained in detail in conjunction with FIG. 3.

Figure 2:
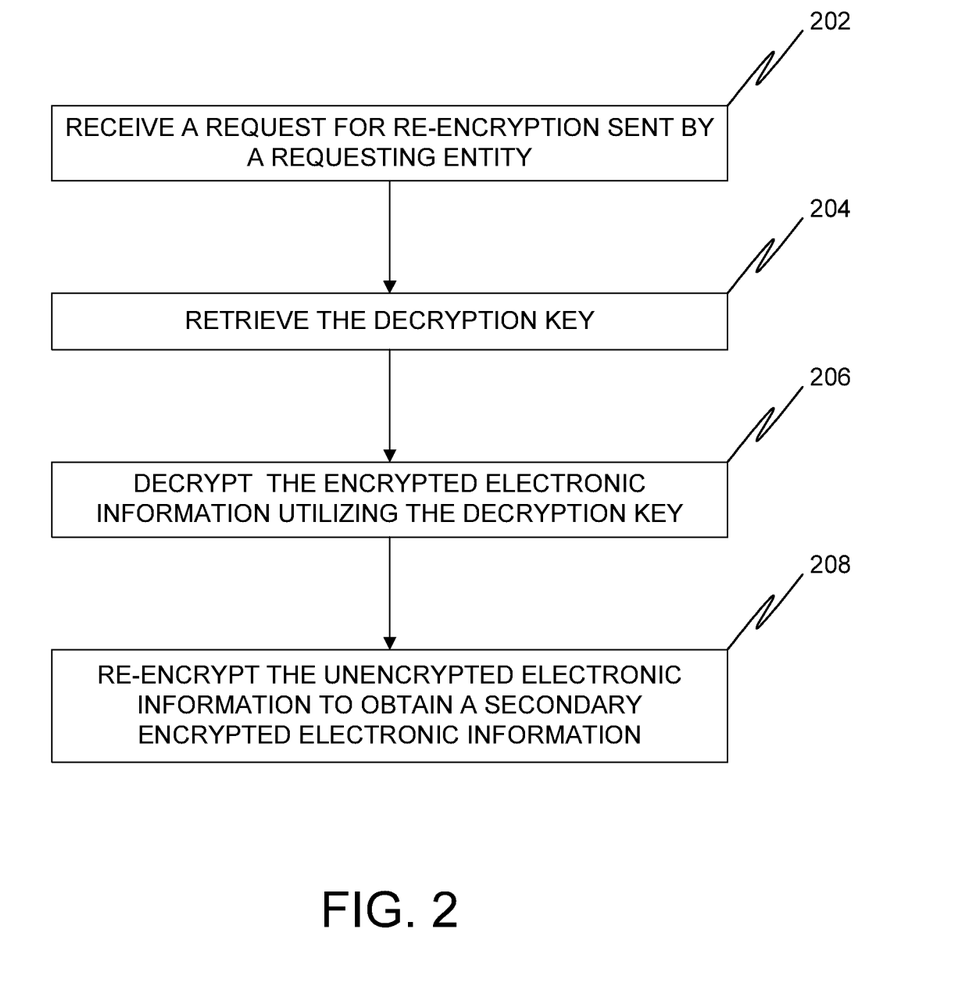
FIG. 2 illustrates a method of facilitating decryption of encrypted electronic information according to another set of embodiments.

FIG. 2 illustrates a method of facilitating decryption of encrypted electronic information in cases where the primary credential is unavailable or not preferable to use due to any reason, according to another set of embodiments. At step 202, the decryption server receives a request for re-encryption sent by the requesting entity. In an embodiment, the request for re-encryption may be initiated manually by one or more of the authorized recipient and the trustee. In another embodiment, the request for re-encryption may be automatically initiated based on predefined rules.

In an embodiment, the request for re-encryption may include the encrypted electronic information. In another embodiment, the request for re-encryption may not include the encrypted electronic information. In this case, the decryption server may already possess the encrypted electronic information. For example, in a case where the decryption server is implemented in the form of an email server, the encrypted electronic information may be present on the email server prior to receiving the request for re-encryption.

Additionally, in some embodiments, the request for re-encryption may include the unique identifier corresponding to one or more of the authorized recipient and the trustee. In another embodiment, the unique identifier may be separately sent to the decryption server. In an embodiment, the unique identifier is used by the decryption server for correctly identifying the decryption key required to decrypt the encrypted electronic information.

In an embodiment, each of the request for re-encryption and the encrypted electronic information may be sent on a common communication channel. In another embodiment, the request for re-encryption and the encrypted electronic information may be sent on disparate communication channels. Further, in an embodiment, one or more of the common communication channel and the disparate communication channels may be protected with a security protocol such as, but not limited to, Transport Layer Security (TLS).

The request for re-encryption is a request to the decryption server to decrypt the encrypted electronic information and re-encrypt the unencrypted electronic information based on the secondary credential in order to obtain a secondary encrypted electronic information.

In some embodiments, prior to fulfilling the request for re-encryption, the requesting entity may be required to authenticate itself to the decryption server. In an embodiment, the authentication may be performed utilizing the secondary credential. In an embodiment, the secondary credential is distinct from the primary credential. In a further embodiment, the secondary credential may be a part of the primary credential. For instance, the primary credential may be an Advanced Encryption Standard (AES) key of length 256-bits while the secondary credential may be the initial 128-bits of the AES key.

In another embodiment, the authentication may be performed utilizing a dedicated authentication key. The dedicated authentication key is distinct from each of the primary credential and the secondary credential. In this embodiment, the secondary credential may be independent of the primary credential. Moreover, the secondary credential may be unverified. Accordingly, the decryption server requires the requesting entity to be authenticated using the dedicated authentication key. For example, a requesting entity may send an arbitrary encryption key to the decryption server along with the request for re-encryption. In this case, the requesting entity is required to provide the dedicated authentication key to prove to the decryption server that the requesting entity is legitimate.

In yet another embodiment, the authentication may be performed based on at least a part of the primary credential. For example, the trustee may send an arbitrary credential to the decryption server, wherein the arbitrary credential corresponds to the authorized recipient. Subsequently, in order to authenticate the request, the trustee may provide at least a part of the primary credential to the decryption server. For example, the trustee may send a predetermined number of initial bits of the private key corresponding to the primary credential.

In some embodiments relating to the request for re-encryption, the requesting entity may not be required to authenticate itself to the decryption server prior to fulfilling the request. For example, in an embodiment, a correspondence between the primary credential and the secondary credential may be registered with the decryption server. In other words, the secondary credential may be registered with the decryption server as a valid equivalent of the primary credential. Accordingly, the decryption server may fulfill the request for re-encryption without authenticating the requesting entity. In this case, it may be sufficient for the requesting entity to provide the unique identifier along with the encrypted electronic information. In effect, registration of the secondary credential with the decryption server provides an implicit authentication of the request for re-encryption.

In general, in embodiments relating to the request for re-encryption, authentication is not needed as long as the decryption server can determine a verified association between the primary credential and the secondary credential. In some embodiments the decryption server may avail service of a specialized server in order to determine the verified association between the primary credential and the secondary credential. In another embodiment, the decryption server may query an electronic device of the requesting entity in order to verify the association between the primary credential and the secondary credential. In this case, the electronic device is registered with the decryption server as belonging to the requesting entity.

In another embodiment, the requesting entity may be required to authenticate itself to the decryption server with a LOA of value less than 3. For example, a valid username and password may be sufficient to authenticate the requesting entity. Nonetheless, protection of the unencrypted information is ensured since the secondary credential is required to decrypt the secondary encrypted electronic information.

However, in some embodiments, for greater security, the requesting entity may be required to authenticate itself to the decryption server prior to fulfilling the request for re-encryption. Such authentication may be performed as described in detail in conjunction with step 104 of FIG. 1.

At step 204, the decryption server retrieves the decryption key as described in detail in conjunction with step 106 of FIG. 1.

Subsequently, at step 206, the decryption server performs decryption of the encrypted electronic information by utilizing the decryption key. As a result of the decryption, the unencrypted electronic information is obtained.

Thereafter, at step 208, the decryption server re-encrypts the unencrypted electronic information to obtain the secondary encrypted electronic information. In some embodiments, the decryption server utilizes the secondary credential to perform the re-encryption of the unencrypted electronic information. As a result, the secondary encrypted electronic information may be decrypted by utilizing the secondary credential. For example, the decryption server may encrypt the unencrypted electronic information using a public key of the secondary credential. Accordingly, by using a private key of the secondary credential, the unencrypted electronic information may be obtained.

In some other embodiments, the unencrypted electronic information may be re-encrypted utilizing a pre-registered encryption key corresponding to the secondary credential. In effect, the pre-registered encryption key functions as a tertiary credential corresponding to the unencrypted electronic information. Accordingly, the secondary encrypted electronic information, when decrypted by utilizing one or more of the pre-registered encryption key and a decryption key corresponding to the pre-registered encryption key, yields the unencrypted electronic information. For example, the authorized recipient may have provided the pre-registered encryption key to the decryption server as part of a registration process. Subsequently, when the request for re-encryption arrives, the decryption server determines the correspondence between the secondary credential and the pre-registered encryption key. Accordingly, the decryption server may perform re-encryption by utilizing the pre-registered key.

In some embodiments relating to the request for re-encryption, the secondary credential, such as a secondary key, may be registered with the decryption server. In other words, the decryption server may already have access to the secondary key. The secondary key may be one or more of a symmetric encryption key and an asymmetric encryption key. For example, in case the secondary key is a public key, the decryption server may be able to retrieve the public key from a directory. As another example, in case the secondary key is a symmetric encryption key, the decryption server may have a secured storage where the symmetric encryption key is stored upon registration of the secondary credential.

Alternatively, in other embodiments, the secondary key may be communicated to the decryption server over a secure communication channel. Further in some other embodiments, an unverified key may be sent to the decryption server along with the request for re-encryption. For example, the trustee may send an arbitrary credential to the decryption server, wherein the arbitrary credential corresponds to the authorized recipient. In some embodiments, the arbitrary credential may be generated based on the secondary credential. For instance, the arbitrary credential may be a cryptographic key pair generated based on the secondary credential. Accordingly, a subject alternative name corresponding to the cryptographic key pair may match with a corresponding subject alternative name of the secondary credential. Further, in an embodiment, the arbitrary credential may be generated regularly at a preset period. The preset period may be configurable. Moreover, a predetermined expiry time may be associated with the arbitrary credential.

Additionally, in some embodiments, the unique identifier corresponding to one or more of the authorized recipient and the trustee is sent to the decryption server. As described earlier, the unique identifier is used by the decryption server for correctly identifying the decryption key required to decrypt the encrypted electronic information. In some other embodiments, the secondary credential sent to the decryption server may in itself be sufficient to correctly identify the decryption key. For example, the secondary credential may be a digital certificate comprising a subject unique identifier and a public key value. Accordingly, the decryption server may extract one or more of the subject unique identifier and the public key value and use the extracted information as the unique identifier.

In some embodiments, the decryption server may perform the re-encryption without even receiving the request for re-encryption. For example, in a case where the decryption server resides inside an e-mail server, the decryption server may automatically perform re-encryption of an encrypted email present in the email server which is addressed to the authorized recipient.

In an embodiment, the decryption server may perform the re-encryption without producing the unencrypted electronic information. For example, a mapping function based on each of the primary credential and the secondary credential may be applied to the encrypted electronic information to directly yield the secondary encrypted electronic information.

After performing the re-encryption, the decryption server may send the secondary encrypted electronic information to the requesting entity for consumption. The requesting entity may be one or more of the authorized recipient, the trustee and a hardware or software entity providing a service to one or more of the authorized recipient and the trustee. Subsequently, the secondary encrypted electronic information is decrypted based on one or more of the secondary credential and a decryption key corresponding to the pre-registered encryption key in different embodiments. For example, in case the requesting entity is the electronic device of the authorized recipient, the decryption of the secondary encrypted electronic information is performed based on the derived private key located on the electronic device.

In some embodiments, the unencrypted electronic information may be a session key corresponding to an encrypted electronic message that is to be consumed by the authorized recipient. Accordingly, subsequent to receiving the session key, the encrypted electronic message may be decrypted based on the session key.

Figure 3:
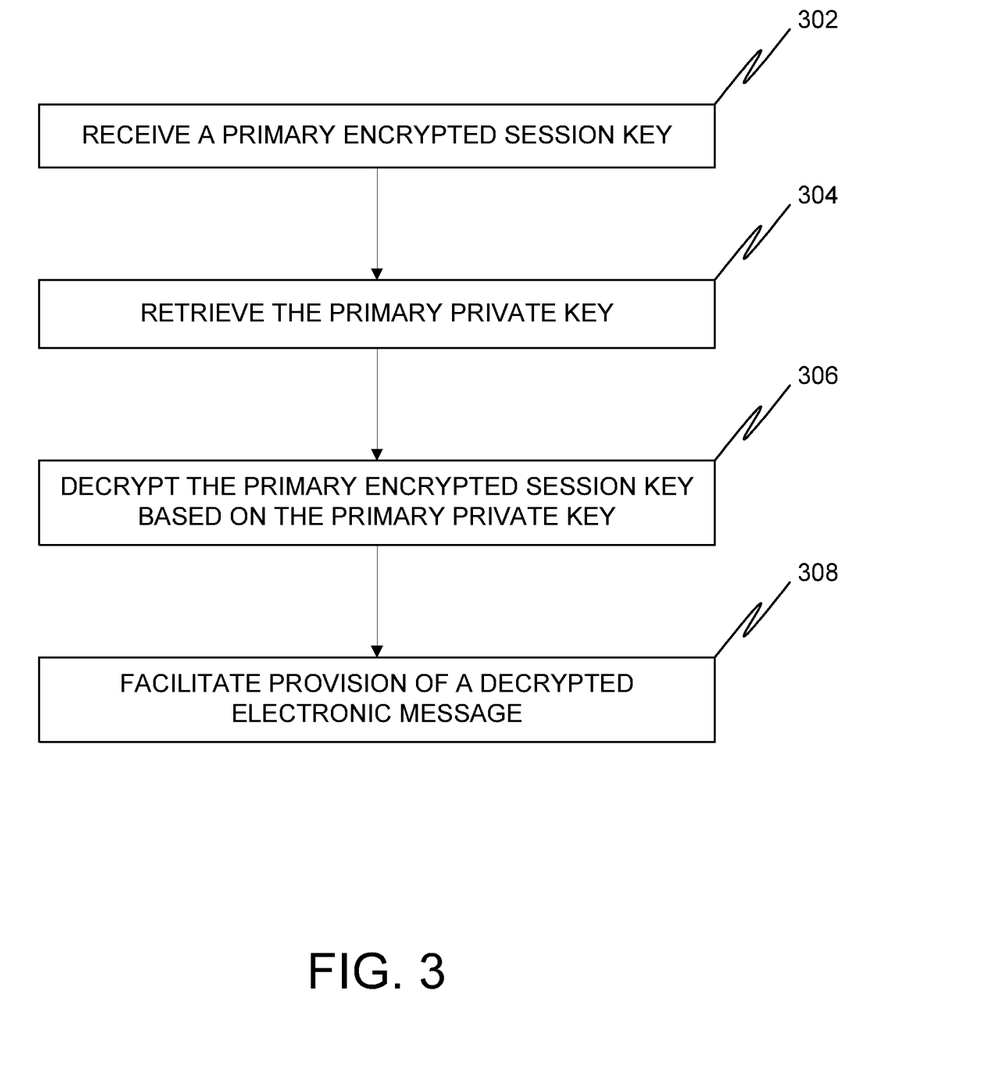
FIG. 3 illustrates a method of facilitating decryption of an encrypted electronic message in accordance with an exemplary embodiment of methods and systems disclosed herein.

FIG. 3 illustrates a method of facilitating decryption of an encrypted electronic message in accordance with an exemplary embodiment of methods and systems disclosed herein. In this embodiment, the encrypted electronic message may be obtained by performing a hybrid encryption on an unencrypted electronic message. According to the hybrid encryption, the unencrypted electronic message is encrypted using a session key. The session key is a symmetric encryption key. In other words, once the unencrypted electronic message is encrypted using the session key, in order to recover the unencrypted electronic message, the session key is required. In an instance, the session key may be pseudo-randomly generated. Further, the session key may be specific to the electronic message. In other words, for each electronic message requiring encryption, a separate session key may be generated.

Additionally, to perform the hybrid encryption, the session key is encrypted based on the primary credential corresponding to the authorized recipient of the electronic message. Particularly, the session key is encrypted using a public key corresponding to the primary credential. As a result, a primary encrypted session key is obtained.

According to the exemplary embodiment, the session key is an instance of the unencrypted electronic information referred to in conjunction with FIG. 1 and FIG. 2.

At step 302, the primary encrypted session key is received. In an embodiment, the primary encrypted session key may be sent by the requesting entity to the decryption server. Each of the requesting entity and the decryption server are described in detail in conjunction with FIG. 1 and FIG. 2. In an instance, the primary encrypted session key may be sent to the decryption server by the electronic device corresponding to the authorized recipient. The electronic device may be, but not limited to, a mobile device such as a smart-phone. Further, it may be required to view to the unencrypted electronic message at the electronic device. However, the primary credential may be unavailable at the electronic device. One reason for the unavailability could be that the primary credential is contained on a smart-card, while the mobile device does not include a smart-card reader. Moreover, a security policy corresponding to the primary credential may forbid export of the primary private key into the electronic device. Other reasons for the unavailability of the primary credential are mentioned in conjunction with FIG. 1. Consequently, the electronic device may send a request to the decryption server for facilitating provision of a decrypted electronic message at the electronic device. The request may include the primary encrypted session key.

In an instance, the request may be sent by an email proxy application executable on the electronic device. The email proxy application may mediate communication between an email client application executable on the electronic device and an email server. In another instance, the request may be sent by the email client application. In yet another instance, the request may be sent by the email server. In a further instance, the request may be sent by an authentication proxy server mediating communication between the electronic device and the decryption server.

In a scenario, the request is an instance of the request for decryption as described in detail in conjunction with FIG. 1. In another scenario, the request is an instance of the request for re-encryption as described in detail in conjunction with FIG. 2.

In the exemplary embodiment disclosed herein, in order to provide greater security, authentication of the requesting entity is performed prior to fulfilling the request for facilitating provision of the decrypted electronic message at the electronic device. Accordingly, the secondary credential is used to perform the authentication. In an instance, the authentication may be performed by the decryption server. In another instance, the authentication may be performed by the authentication proxy server.

In order to provide strong authentication, the secondary credential used for the authentication is one that is based on the primary credential. Further, the secondary credential may be the derived credential issued based on the primary credential, such as the smart-card credential. For instance, the derived credential may be issued in accordance with National Institute of Standards and Technology (NIST) Special Publication 800-157. According a high Level of Assurance (LOA) is provided. For example, the LOA corresponding to the secondary credential may be at least Level-3 as defined in E-Authentication Guidance for Federal Agencies (OMB 04-04).

At step 304, the primary private key corresponding to the primary credential is retrieved. In a scenario, the decryption server may communicate with the certificate authority in order to retrieve the primary private key. In another scenario, the decryption server may retrieve the primary private key from the Hardware Security Module (HSM). Further, the decryption server may store the primary private key, received from the certificate authority, into the HSM. Accordingly, a subsequent request for accessing the primary private key may be fulfilled in a shorter time. In yet another scenario, the decryption server may retrieve the primary private key from the local cache of the decryption server.

The primary private key may be retrieved based on one or more of the primary credential, the secondary credential and the unique identifier as described in detail in conjunction with FIG. 1 and FIG. 2. In general, the primary private key may be retrieved based on any token that associates one or more of the authorized recipient and the trustee to the primary credential. For instance, the primary private key may be retrieved based on an email address of the authorized recipient. Further, the email address may be extracted from the secondary credential such as a digital certificate. Moreover, the unique identifier may be obtained in conjunction with the authentication of the requesting entity. For example, the authentication proxy server may extract the unique identifier from the secondary credential sent by the requesting entity for authentication.

Subsequently, at step 306, the primary encrypted session key is decrypted based on the primary private key. As a result, an unencrypted session key is obtained.

Thereafter, at step 308, provision of a decrypted electronic message at the electronic device is facilitated based on the unencrypted session key.

In a scenario, the unencrypted session key is delivered to the electronic device. Subsequently, the unencrypted session key is used to obtain the decrypted electronic message.

In another scenario, subsequent to decrypting the primary encrypted session key, the unencrypted session key is re-encrypted based on the secondary credential to yield the secondary encrypted session key. For instance, a public key corresponding to the secondary credential may be used for performing the re-encryption. Details about the re-encryption are provided in conjunction with FIG. 2.

In an instance, the secondary encrypted session key is delivered to the electronic device. Subsequently, the secondary encrypted session key may be inserted into a message header of the encrypted electronic message by the email proxy application executable on the electronic device. In an instance, the secondary encrypted session key may replace the encrypted session key in the message header. In another instance, the secondary encrypted session key may co-exist with the encrypted session key in the message header. Thereafter, the encrypted electronic message may be delivered to the email client application executable on the electronic device. Since the email client application has access to the secondary credential, such as the derived credential located on the electronic device, the email client application may recover the unencrypted session key by utilizing the secondary credential. For example, the email client application may use a secondary private key corresponding to the secondary credential in order to decrypt the secondary encrypted session key. Once the unencrypted session key is available, the email client application may decrypt the encrypted electronic message to obtain the decrypted electronic message.

In an instance, a cryptographic key pair may be generated on the electronic device based on the secondary credential. The cryptographic key pair may include an encryption key and a decryption key. Further, the cryptographic key pair may be provided to each of the email proxy application and the email client application. Accordingly, the email proxy application may use the encryption key of the cryptographic key pair for re-encrypting the unencrypted session key. Consequently, the email client application may use the decryption key of the cryptographic key pair to decrypt the secondary encrypted session key. In an instance, the cryptographic key pair may be generated based on the secondary credential. Accordingly, a subject alternative name corresponding to the cryptographic key pair may match a corresponding subject alternative name of the secondary credential. Further, in an instance, the cryptographic key pair may be generated regularly at a preset period. Accordingly, a newly generated cryptographic key pair may replace a previously used cryptographic key pair. Moreover, the preset period may be configurable.

In an instance, the email client application may configure the email proxy application to automatically perform re-encryption of the encrypted electronic message based on the secondary credential. In another instance, the email client application may configure the email proxy application to perform the re-encryption of the encrypted electronic message based on a corresponding request from the email client application. In yet another instance, the email client application may configure the email proxy application to automatically perform decryption of the encrypted electronic message and subsequently deliver the decrypted electronic message to the email client application. In this case, the email proxy application may not modify the header of the encrypted electronic message to include the secondary encrypted session key. Accordingly, the encrypted electronic message remains unmodified within the email client application.

Figure 4:
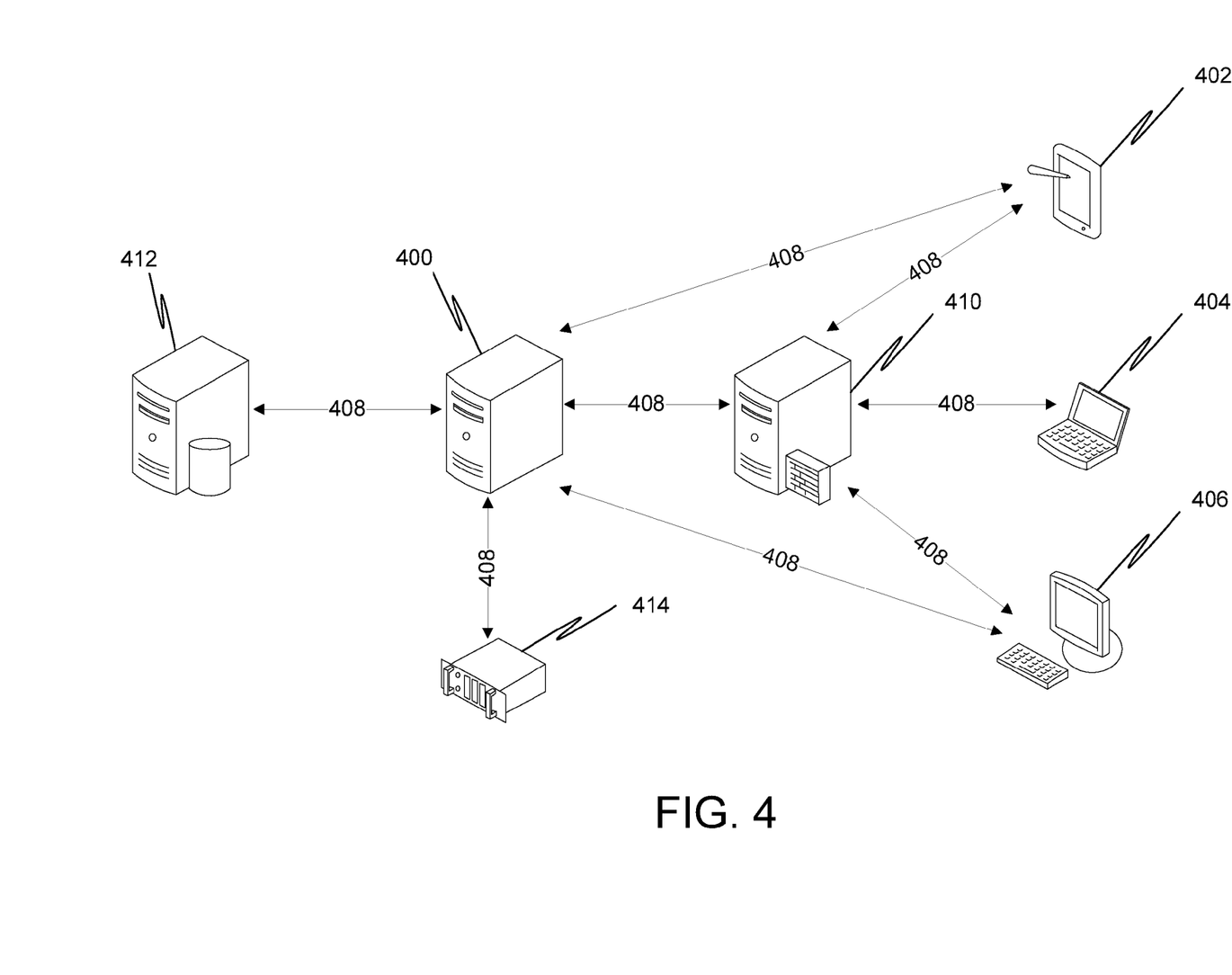
FIG. 4 illustrates a system for facilitating decryption of encrypted electronic message in accordance with various embodiments disclosed herein.

FIG. 4 illustrates a system for facilitating decryption of the encrypted electronic message in accordance with some embodiments disclosed herein. The system comprises decryption server 400 which is an instance of the decryption server described in detail in conjunction with FIG. 1, FIG. 2 and FIG. 3.

Decryption server 400 is configured to receive the request for facilitating decryption sent by the requesting entity, such as electronic device 402, electronic device 404 and workstation 406 as illustrated exemplarily. In order to receive the request, decryption server 400 is configured to communicate with each of electronic device 402, electronic device 404 and workstation 406 over communication channel 408. In some embodiments, communication channel 408 may be one or more of a wired communication channel and a wireless communication channel. Moreover, communication channel 408 may comprise one or more of a single communication channel such as the internet and multiple disparate communication channels. Further, in some embodiments, communication channel 408 may be protected by a security protocol such as, but not limited to, TLS protocol. Accordingly, decryption server 400 is configured to communicate using the security protocol. Examples of communication channel 408 include, but are not limited to, a Local Area Network (LAN), Wide Area Network (WAN), Virtual Private Network (VPN), telephone network, cellular network, Wimax, WiFi, Bluetooth, internal system bus of an electronic device and Inter-Process Communication (IPC) channel.

Further, in some embodiments, decryption server 400 may be configured to communicate with authentication proxy server 410 which is an instance of the authentication proxy server as described in conjunction with FIG. 1, FIG. 2 and FIG. 3. In some embodiments, decryption server 400 may be configured to receive the request for facilitating decryption from authentication proxy server 410. In some other embodiments, decryption server 400 may be configured to receive the request for facilitating decryption from the application server (not shown in FIG. 4), such as the email server.

In an embodiment, decryption server 400 may be configured to perform authentication of the requesting entity. In another embodiment, decryption server 400 may be configured to communicate with authentication proxy server 410 to perform the authentication of the requesting entity.

Further, decryption server 400 may be configured to retrieve the decryption key in order to facilitate decryption of the encrypted electronic message. In an embodiment, decryption server 400 may be configured to communicate with the source entity, such as certificate authority 412 in order to retrieve the decryption key. Further, decryption server 400 may be configured to communicate with the Hardware Security Module (HSM) such as HSM 414. In an embodiment, HSM 414 may be a part of decryption server 400. In some embodiments, decryption server 400 may be configured to communicate with the specialized server in order to determine the verified association between the primary credential and the secondary credential.

Moreover, decryption server 400 may be configured to perform decryption of the encrypted electronic information based on the decryption key. In an embodiment, HSM 414 may be further configured to perform the decryption.

Further, decryption server 400 may also be configured to perform the re-encryption of the unencrypted electronic information in order to yield the secondary encrypted electronic information. Additionally, decryption server 400 may in some embodiments be configured to communicate with the directory such as a Lightweight Directory Access Protocol (LDAP) directory (not shown in FIG. 4) in order to retrieve the secondary credential used for performing the re-encryption. For example, a secondary public key corresponding to the secondary credential of the authorized recipient may be published in the LDAP directory.

In general, in different embodiments, the system for facilitating decryption of the encrypted electronic message may include one or more of the decryption server, the HSM, the application server, the authentication proxy server, the electronic device, the source entity such as the certificate authority and the LDAP directory.

In an instance, the system for facilitating decryption of the encrypted electronic message may be authentication proxy server 410. In other words, authentication proxy server 410 may be an instance of the decryption server described in detail in conjunction with FIG. 1, FIG. 2 and FIG. 3. Accordingly, authentication proxy server 410 may be configured to communicate with one or more of certificate authority 412 and HSM 414 in order to retrieve the decryption key.

In another instance, the system for facilitating decryption of the encrypted electronic message may be the application server. In yet another instance, the system for facilitating decryption of the encrypted electronic message may be certificate authority 412.

In a further instance, the system for facilitating decryption of the encrypted electronic message may be electronic device 404. Accordingly, electronic device 404 may be configured to communicate with one or more of certificate authority 412 and HSM 414 in order to retrieve the decryption key. Further, electronic device 404 may be configured to communicate with one or more of electronic device 402 and workstation 406.

In an instance, the system for facilitating decryption of the encrypted electronic message may be workstation 406. Accordingly, workstation 406 may have access to the decryption key. For example, workstation 406 may include a smart-card reader capable of retrieving the decryption key located on a smart-card. Further, in a scenario, the requesting entity may be electronic device 402. Accordingly, workstation 406 may be configured to communicate with electronic device 402 in order to facilitate decryption of encrypted electronic information. In another scenario, the requesting entity may be one or more of a hardware entity and a software entity located within workstation 406. For example, an application program executable on workstation 406 may be the requesting entity.

Accordingly, workstation 406 may include an internal interface to communicate with one or more of the hardware entity and the software entity. In this case, the decryption server may be implemented as a virtual server executable on workstation 406. Moreover, the application program may have access to the secondary credential. In a scenario the application program access the secondary credential from a memory unit of workstation 406. In another scenario, the application program may obtain the secondary credential from an input unit, such as a camera, of workstation 406.

Further disclosed herein is a non-transitory computer readable medium for executable a method for facilitating decryption of the encrypted electronic message. The non-transitory computer readable medium comprises program code recorded thereon such that when placed in communicable contact with a processor, the processor performs one or more steps described in conjunction with FIG. 1, FIG. 2 and FIG. 3. The non-transitory computer readable medium may include, but is not limited to, Magnetic Storage Media (e.g. hard disks, floppy discs, or magnetic tape), optical media (e.g., any type of compact disc (CD), or any type of digital video disc (DVD), or other compatible non-volatile memory device as desired). Further, the program code may be downloaded to the processor for execution.

In an embodiment, the processor may be present in the electronic device. Accordingly, upon execution of the program code, the primary encrypted session key may be extracted from the encrypted electronic message. Subsequently, the processor may cause transmission of each of the primary encrypted session key and at least a part of the secondary credential to an external server. The external sever may be one or more of the authentication proxy server and the decryption. Thereafter, the processor may receive the unencrypted session key from the external server. Subsequently, the processor may facilitate decryption of the encrypted electronic message based on the unencrypted session key. In an embodiment, in order to facilitate decryption, the processor may encrypt the unencrypted session key based on the secondary credential to obtain the secondary encrypted session key. Further, the processor may insert the secondary encrypted session key into the message header of the encrypted electronic message. In another embodiment, in order to facilitate decryption, the processor may provide the unencrypted session key to the email client application executable on the electronic device.

The foregoing methods of and systems for facilitating decryption of encrypted electronic information provide one or more advantages in various embodiments. One advantage is that even when the authorized recipient does not have access to the decryption key, the encrypted electronic information may be decrypted and provided to the authorized recipient. Another advantage is that the trustee of the unencrypted electronic information may be enabled to securely share the unencrypted electronic information with an authorized recipient without sharing the decryption key with the authorized recipient. Yet another advantage is that the authorized recipient may consume the unencrypted electronic information on the electronic device even if the electronic device does not have sufficient computational resources for performing the decryption.

While various embodiments of the disclosed methods and systems have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

I claim:

1. A method of facilitating decryption of an encrypted electronic message, the method comprising:
   receiving a primary encrypted session key, wherein the primary encrypted session key is generated based on a primary credential corresponding to an authorized recipient of the encrypted electronic message, wherein the primary credential corresponds to a primary public key;
   retrieving a primary private key corresponding to the primary credential;
   decrypting the primary encrypted session key based on the primary private key to obtain an unencrypted session key; and
   facilitating provision of a decrypted electronic message at an electronic device corresponding to the authorized recipient based on each of the unencrypted session key and a secondary credential corresponding to the authorized recipient, wherein the secondary credential is issued to the authorized recipient based on a validation of the primary credential; and
   authenticating the electronic device based on the secondary credential, wherein retrieving the primary private key is based on at least a part of the secondary credential, wherein facilitating provision of the decrypted
   electronic message comprises providing the unencrypted session key to the electronic device.

2. The method of claim 1, wherein a Level of Assurance (LOA) corresponding to the secondary credential is at least Level-3 as defined in E-Authentication Guidance for Federal Agencies (OMB 04-04).

3. The method of claim 1, wherein a security policy corresponding to the primary credential forbids export of the primary private key.

4. The method of claim 1, wherein the primary credential is a smart card credential and the secondary credential is a derived credential, wherein the derived credential is issued based on the smart card credential.

5. The method of claim 4, wherein the derived credential is issued in accordance with National Institute of Standards and Technology (NIST) Special Publication 800-157.

6. The method of claim 1 further comprising:
receiving a unique identifier corresponding to the authorized recipient, wherein retrieving the primary private key is based on the unique identifier; and
encrypting the unencrypted session key based on the secondary credential to obtain a secondary encrypted session key, wherein facilitating provision of the decrypted electronic message comprises providing the secondary encrypted session key to the electronic device.

7. The method of claim 1 further comprising:
receiving each of the primary encrypted session key and the secondary credential at an authentication proxy server, wherein the authentication proxy server is in communication with the electronic device in order to perform the receiving, wherein the secondary credential establishes authenticity of the electronic device to the authentication proxy server; and
extracting a unique identifier from the secondary credential, wherein retrieving the primary private key is based on the unique identifier.

8. The method of claim 7 further comprising encrypting the unencrypted session key based on the secondary credential to obtain a secondary encrypted session key, wherein facilitating provision of the decrypted electronic message comprises providing the secondary encrypted session key to the electronic device.

9. The method of claim 8, wherein providing the secondary encrypted session key comprises inserting the secondary encrypted session key into a message header of the encrypted electronic message.

10. The method of claim 8 further comprising:
decrypting the secondary encrypted session key based on the secondary credential to obtain the unencrypted session key; and
decrypting the encrypted electronic message based on the unencrypted session key.

11. The method of claim 7, wherein facilitating provision of the decrypted electronic message comprises providing the unencrypted session key to the electronic device.

12. The method of claim 1 further comprising generating a cryptographic key pair based on the secondary credential, wherein a subject alternative name corresponding to the cryptographic key pair matches a corresponding subject alternative name of the secondary credential.

13. The method of claim 12 further comprising regenerating the cryptographic key pair regularly at a preset period, wherein the preset period is configurable.

14. The method of claim 1 further comprising:
communicating with a certificate authority to retrieve the primary private key;
storing the primary private key in a Hardware Security Module (HSM); and
communicating with the Hardware Security Module (HSM) to retrieve the primary private key.

15. A system for facilitating decryption of an encrypted electronic message, the system comprising a first processor and a local cache, wherein the system is configured to:
receive, using the first processor, a primary encrypted session key, wherein the primary encrypted session key is generated based on a primary credential corresponding to an authorized recipient of the encrypted electronic message, wherein the primary credential corresponds to a primary public key;
retrieve, using the first processor, a primary private key corresponding to the primary credential;
store the primary private key in the local cache;
decrypt, using the first processor, the primary encrypted session key based on the primary private key to obtain an unencrypted session key; and
facilitate, using the first processor, provision of a decrypted electronic message at an electronic device corresponding to the authorized recipient based on each of the unencrypted session key and a secondary credential corresponding to the authorized recipient, wherein the secondary credential is issued to the authorized recipient based on a validation of the primary credential; and
authenticating the electronic device based on the secondary credential, wherein retrieving the primary private key is based on at
least a part of the secondary credential, wherein facilitating provision of the decrypted electronic message comprises providing the unencrypted session key to the electronic device.

16. The system of claim 15, wherein a Level Of Assurance (LOA) corresponding to the secondary credential is at least Level-3 as defined in E-Authentication Guidance for Federal Agencies (OMB 04-04).

17. The system of claim 15, wherein a security policy corresponding to the primary credential forbids export of the primary private key.

18. The system of claim 15, wherein the primary credential is a smart card credential and the secondary credential is a derived credential, wherein the derived credential is issued based on the smart card credential.

19. The system of claim 18, wherein the derived credential is issued in accordance with National Institute of Standards and Technology (NIST) Special Publication 800-157.

20. The system of claim 15, wherein the first processor is further configured to:
receive a unique identifier corresponding to the authorized recipient, wherein retrieving the primary private key is based on the unique identifier; and
encrypt the unencrypted session key based on the secondary credential to obtain a secondary encrypted session key, wherein to facilitate provision of the decrypted electronic message, the first processor is configured to provide the secondary encrypted session key to the electronic device.

21. The system of claim 15, wherein the first processor is further configured to communicate with an authentication proxy server, wherein the authentication proxy server is configured to:
receive each of the primary encrypted session key and the secondary credential, wherein the authentication proxy server is in communication with the electronic device in order to perform the receiving, wherein the secondary credential establishes authenticity of the electronic device to the authentication proxy server; and extracting a unique identifier from the secondary credential, wherein retrieving the primary private key is based on the unique identifier.

22. The system of claim 21, wherein the first processor is further configured to encrypt the unencrypted session key based on the secondary credential to obtain a secondary encrypted session key, wherein to facilitate provision of the decrypted electronic message, the first processor is configured to provide the secondary encrypted session key to the electronic device.

23. The system of claim 22, wherein a second processor comprised in the electronic device is configured to insert the secondary encrypted session key into a message header of the encrypted electronic message.

24. The system of claim 23, wherein the second processor comprised in the electronic device is configured to:
 decrypt the secondary encrypted session key based on the secondary credential to obtain the unencrypted session key; and
 decrypting the encrypted electronic message based on the unencrypted session key.

25. The system of claim 21, wherein the first processor is configured to provide the unencrypted session key to the electronic device to facilitate provision of the decrypted electronic message.

26. The system of claim 15, wherein the second processor comprised in the electronic device is configured to generate a cryptographic key pair based on the secondary credential, wherein a subject alternative name corresponding to the cryptographic key pair matches a corresponding subject alternative name of the secondary credential.

27. The system of claim 26, wherein the second processor is further configured to regenerate the cryptographic key pair regularly at a preset period, wherein the preset period is configurable.

28. The system of claim 15, wherein the first processor is further configured to:
 communicate with a certificate authority to retrieve the primary private key;
 store the primary private key in a Hardware Security Module (HSM); and
 communicate with the Hardware Security Module (HSM) to retrieve the primary private key.

29. A non-transitory computer readable medium for executing a method for facilitating decryption of an encrypted electronic message at an electronic device corresponding to an authorized recipient of the encrypted electronic message, the non-transitory computer readable medium having program code recorded thereon such that when placed in communicable contact with a processor comprised in the electronic device, the processor performs the steps of:
 extracting a primary encrypted session key from the encrypted electronic message, wherein the primary encrypted session key is generated based on a primary credential corresponding to the authorized recipient, wherein the primary credential corresponds to a primary public key;
 transmitting each of the primary encrypted session key and at least a part of secondary credential to an external server, wherein the secondary credential provides authentication of the electronic device with a Level of Assurance (LOA) being at least Level-3 as defined in E-Authentication Guidance for Federal Agencies (OMB 04-04), wherein the secondary credential is issued to the authorized recipient based on a validation of the primary credential;
 receiving an unencrypted session key from the external server;
 facilitating decryption of the encrypted electronic message based on the unencrypted session key; and
 authenticating the electronic device based on the secondary credential, wherein retrieving the primary private key is based on at least a part of the secondary credential, wherein facilitating provision of the decrypted electronic message comprises providing the unencrypted session key to the electronic device.

30. The non-transitory computer readable medium of claim 29, wherein facilitating decryption of the encrypted electronic message comprises:
 encrypting the unencrypted session key based on the secondary credential to obtain a secondary encrypted session key; and
 inserting the secondary encrypted session key into a message header of the encrypted electronic message.

31. The non-transitory computer readable medium of claim 29, wherein facilitating decryption of the encrypted electronic message comprises providing the unencrypted session key to an email client application executable on the electronic device.

32. A method of facilitating decryption of an encrypted electronic message, the method comprising:
 receiving a primary encrypted session key, wherein the primary encrypted session key is generated based on a primary credential corresponding to an authorized recipient of the encrypted electronic message, wherein the primary credential corresponds to a primary public key;
 retrieving a primary private key corresponding to the primary credential;
 decrypting the primary encrypted session key based on the primary private key to obtain an unencrypted session key;
 encrypting the unencrypted session key based on a secondary credential to obtain a secondary encrypted session key, wherein the secondary credential corresponds to the authorized recipient wherein the secondary credential is issued to the authorized recipient based on a validation of the primary credential; and
 providing the secondary encrypted session key to the electronic device for facilitating decryption of the encrypted electronic message; and
 authenticating the electronic device based on the secondary credential, wherein retrieving the primary private key is based on at least a part of the secondary credential, wherein facilitating provision of the decrypted electronic message comprises providing the unencrypted session key to the electronic device.

* * * * *